United States Patent
Ezaki

(10) Patent No.: US 7,366,907 B1
(45) Date of Patent: Apr. 29, 2008

(54) INFORMATION PROCESSING DEVICE AND METHOD AND PROGRAM STORAGE MEDIUM

(75) Inventor: Tadashi Ezaki, Tokyo (JP)

(73) Assignee: Sony Corporation (JP)

( * ) Notice: Subject to any disclaimer, the term of this patent is extended or adjusted under 35 U.S.C. 154(b) by 1177 days.

(21) Appl. No.: 09/869,258

(22) PCT Filed: Oct. 27, 2000

(86) PCT No.: PCT/JP00/07594

§ 371 (c)(1),
(2), (4) Date: Jun. 26, 2001

(87) PCT Pub. No.: WO01/31630

PCT Pub. Date: May 3, 2001

(30) Foreign Application Priority Data

Oct. 29, 1999 (JP) ............................... P11-310326

(51) Int. Cl.
  *H04L 9/00* (2006.01)
(52) U.S. Cl. ..................................... 713/176
(58) Field of Classification Search ................ 713/176
  See application file for complete search history.

(56) References Cited

U.S. PATENT DOCUMENTS

| | | | | |
|---|---|---|---|---|
| 5,832,119 A * | 11/1998 | Rhoads | ........................ | 382/232 |
| 6,154,571 A * | 11/2000 | Cox et al. | .................... | 382/250 |
| 6,278,668 B1 * | 8/2001 | Hirokane et al. | .......... | 369/13.4 |
| 6,278,836 B1 * | 8/2001 | Kawara et al. | ................ | 386/94 |
| 6,301,663 B1 * | 10/2001 | Kato et al. | ................... | 713/176 |
| 6,307,949 B1 * | 10/2001 | Rhoads | ........................ | 382/100 |
| 6,310,956 B1 * | 10/2001 | Morito et al. | ................ | 380/201 |
| 6,320,829 B1 * | 11/2001 | Matsumoto et al. | ..... | 369/47.12 |
| 6,345,256 B1 * | 2/2002 | Milsted et al. | ................. | 705/1 |
| 6,370,319 B1 * | 4/2002 | Matsumoto et al. | .......... | 386/94 |
| 6,389,403 B1 * | 5/2002 | Dorak, Jr. | ..................... | 705/52 |
| 6,434,322 B1 * | 8/2002 | Kimura et al. | ................ | 386/94 |
| 6,438,692 B2 * | 8/2002 | Kato et al. | ................... | 713/176 |
| 6,545,955 B1 * | 4/2003 | Iwata et al. | ................ | 369/13.4 |
| 6,598,162 B1 * | 7/2003 | Moskowitz | ................. | 713/176 |
| 6,674,858 B1 * | 1/2004 | Kimura et al. | .............. | 380/202 |

(Continued)

FOREIGN PATENT DOCUMENTS

EP    0 903 736 A2    3/1999

(Continued)

*Primary Examiner*—Nasser Moazzami
*Assistant Examiner*—David Garcí a Cervetti
(74) *Attorney, Agent, or Firm*—Lerner, David, Littenberg, Krumholz & Mentlik, LLP

(57) ABSTRACT

An information processing device and method as well as a program storage medium, in which to determine whether or not contents can be recorded on a recording medium, the presence or absence of digital watermark information distributed associated with the contents is detected, and if the digital watermark information is present, the survival rate of the digital watermark information is detected, and it is determined whether or not the contents can be recorded on the recording medium on the basis of the presence or absence of the digital watermark information and the survival rate of the digital watermark information. In this way, it is possible to prevent effectively an infringement of the copyright on the contents that have been distributed via a network to a great number of terminal units.

37 Claims, 15 Drawing Sheets

U.S. PATENT DOCUMENTS

| | | | |
|---|---|---|---|
| 6,687,802 B1 * | 2/2004 | Kori et al. | 711/163 |
| 6,711,276 B1 * | 3/2004 | Yoshiura et al. | 382/100 |
| 6,721,437 B1 * | 4/2004 | Ezaki et al. | 382/100 |
| 6,757,405 B1 * | 6/2004 | Muratani et al. | 382/100 |
| 6,785,815 B1 * | 8/2004 | Serret-Avila et al. | 713/176 |
| 6,802,074 B1 * | 10/2004 | Mitsui et al. | 725/25 |
| 6,850,619 B1 * | 2/2005 | Hirai | 380/203 |
| 6,937,553 B1 * | 8/2005 | Mitui et al. | 369/84 |
| 6,952,774 B1 * | 10/2005 | Kirovski et al. | 713/176 |
| 7,099,493 B2 * | 8/2006 | Muratani | 382/100 |

FOREIGN PATENT DOCUMENTS

| | | |
|---|---|---|
| JP | 8-129826 | 5/1996 |
| JP | 11-86435 | 3/1999 |
| JP | 11-144380 | 5/1999 |
| JP | 11-155125 | 6/1999 |

* cited by examiner

| | |
|---|---|
| 1 BIT<br>(COPY CONTROL BIT) | BIT INDICATING WHETHER COPY IS POSSIBLE OR NOT IF ALREADY COMPRESSED.<br><br>1: COPY IMPOSSIBLE    0: COPY POSSIBLE |
| 3 BITS<br>(THRESHOLD SETTING BIT) | BITS SPECIFYING THE THRESHOLD IN % FOR THE SURVIVAL RATE OF DIGITAL WATERMARK INFORMATION TO DETERMINE WHETHER COMPRESSED OR NOT<br>111: 80%   011: 40%<br>110: 70%   010: 30%<br>101: 60%   001: 20%<br>100: 50%   000: 10% |
| 2 BITS<br>(QUALITY SETTING BIT) | BITS INDICATING THE ALLOWABLE QUALITY OF COPYING (RECORDING OR REPRODUCTION) WHEN ALREADY COMPRESSED.<br><br>11: 64 KBPS STEREO<br>10: 48 KBPS MONO<br>01: 48 KBPS STEREO<br>00: 32 KBPS MONO |
| 2 BITS<br>(COMPRESSION METHOD SETTING BIT) | BITS INDICATING THE ALLOWABLE QUALITY (TYPE OF CODEC) OF COPYING WHEN ALREADY COMPRESSED.<br><br>11: AAC POSSIBLE FOR 64 KBPS STEREO OR LESS<br>10: AAC POSSIBLE FOR 32 KBPS STEREO OR LESS<br>01: MP3 POSSIBLE FOR 64 KBPS MONO OR LESS<br>00: MP3 POSSIBLE FOR 32 KBPS MONO OR LESS |

FIG. 5

| | |
|---|---|
| 1 BIT (COPY CONTROL BIT) | BIT INDICATING WHETHER COPY IS POSSIBLE OR NOT IF ALREADY COMPRESSED.<br><br>1: COPY IMPOSSIBLE  0: COPY POSSIBLE |
| 3 BITS (THRESHOLD SETTING BIT) | BITS SPECIFYING THE THRESHOLD IN % FOR THE SURVIVAL RATE OF DIGITAL WATERMARK INFORMATION WEAK TO COMPRESSION TO DETERMINE WHETHER COMPRESSED OR NOT<br>111: 80%  011: 40%<br>110: 70%  010: 30%<br>101: 60%  001: 20%<br>100: 50%  000: 10% |
| 2 BITS (QUALITY SETTING BIT) | BITS INDICATING THE ALLOWABLE QUALITY OF COPYING (RECORDING OR REPRODUCTION) WHEN ALREADY COMPRESSED.<br><br>11: 64 KBPS STEREO<br>10: 48 KBPS MONO<br>01: 48 KBPS STEREO<br>00: 32 KBPS MONO |
| 2 BITS (COMPRESSION METHOD SETTING BIT) | BITS INDICATING THE ALLOWABLE QUALITY (TYPE OF CODEC) OF COPYING WHEN ALREADY COMPRESSED.<br><br>11: AAC POSSIBLE FOR 64 KBPS STEREO OR LESS<br>10: AAC POSSIBLE FOR 32 KBPS STEREO OR LESS<br>01: MP3 POSSIBLE FOR 64 KBPS MONO OR LESS<br>00: MP3 POSSIBLE FOR 32 KBPS MONO OR LESS |

FIG. 12

INFORMATION PROCESSING DEVICE AND METHOD AND PROGRAM STORAGE MEDIUM

TECHNICAL FIELD

The present invention relates to an information processing device and method as well as a program storage medium, and is suitably applied to protection of the copyright of the music data, for example.

BACKGROUND ART

In recent years, the music contents have been distributed from a Web site via a network such as the Internet to a great number of network terminal units (computers).

The user of computer can record the distributed music contents in the digital data form on various sorts of recording medium, and create the music software having favorable music recorded at high quality of sound at will.

In this way, the user who operates the computer has only to gain access to the Web site to record the music contents on the recording medium freely. However, the act of a Web site opening side distributing the music contents that are authors without the prior permission of the copyright holder may cause a problem with the infringement of copyright on the music contents.

DISCLOSURE OF THE INVENTION

The present invention has been achieved in the light of the above-mentioned problem, and it is an object of the invention to provide an information processing device and method and a program storage medium, in which when the music contents are distributed via a network to a great number of terminal units, for example, it is possible to effectively prevent the infringement of copyright on the music contents.

In order to accomplish the above object, according to the invention, it is possible to effectively prevent the infringement of copyright on the contents distributed via the network to a great number of terminal units in such a manner as to detect a survival rate of digital watermark information distributed associated with the contents, when controlling the output of contents, and control the output of the contents based on the survival rate of digital watermark information.

Also, the contents can be distributed in accordance with the intention of the copyright holder by controlling the output of contents on the basis of the qualified information contained in the digital watermark information.

BRIEF DESCRIPTION OF THE DRAWINGS

FIG. 5 is a table showing the usage information ID (Usage ID) contained in the digital watermark information.

FIG. 12 is a diagram showing the usage information ID (Usage ID) contained in the digital watermark information strong to compression.

BEST MODE FOR CARRYING OUT THE INVENTION

One embodiment of the present invention will be described below with reference to the drawings.

Figure 1:
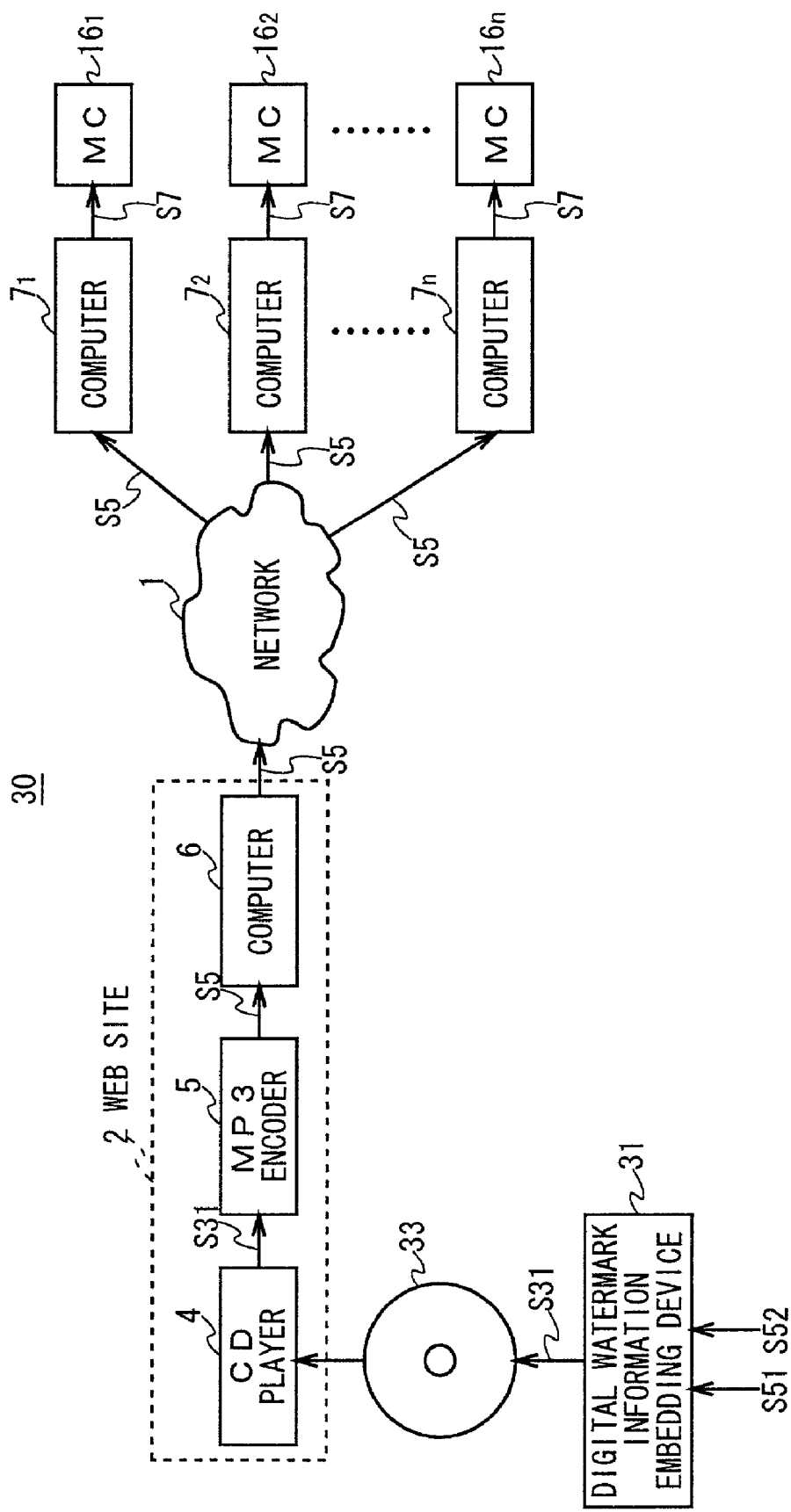
FIG. 1 is a block diagram showing a distribution system of the music contents with an information processing device according to the present invention.

FIG. 1 shows a music distribution system 30 as a whole, in which a computer 6 on a Web site 2 and the computers $7_1$ to $7_n$ employed by the users are connected via a network 1.

In the music distribution system 30, a digital watermark information embedding device 31 embeds the digital watermark information S52 into an input audio signal S51 without impairing the hearing sense of the sound, and records an audio signal with digital watermark information S31 on a CD (Compact Disk) 33.

In the Web site 2, a CD player 4 reproduces the audio signal with digital watermark information S31 from the CD 33, and supplies it to an MP3 (MPEG Layer 3) encoder 5. The MP3 encoder 5 compresses the audio signal with digital watermark information S31, and creates an MP3 file S5. The MP3 file S5 is distributed from the computer 6 via the network 1 to a great number of computers $7_1$ to $7_n$.

The computer $7_1$ to $7_n$ decodes the MP3 file S5 in accordance with an operation of the user, and determines whether or not to record (copy) the audio signal on an MC (Memory card) $16_1$ to $16_n$ mounted in accordance with the residual amount of digital watermark information embedded into the decoded audio signal, as well as the recording qualification.

If the result of determination indicates to be recordable (copy permitted), the computer $7_1$ to $7_n$ newly compresses the audio signal in accordance with the ATPAC (Adaptive Transform Acoustic Coding) to produce the compressed voice data S7, and store it in the MC (Memory Card) $16_1$ to $16_n$. Further, if the result of determination indicates that the recording qualification is imposed, the computer $7_1$ to $7_n$ newly compresses the audio signal only with the recording qualification released in accordance with the ATRAC to produce the compressed voice data S7 and store it in the memory card $16_1$ to $16_n$. On the contrary, the result of determination is unrecordable (copy unpermitted), the computer $7_1$ to $7_n$ does not perform the recording process for the audio signal.

In this connection, the memory card $16_1$ to $16_n$ is a portable type recording medium called a PD (Portable Device).

Figure 2:
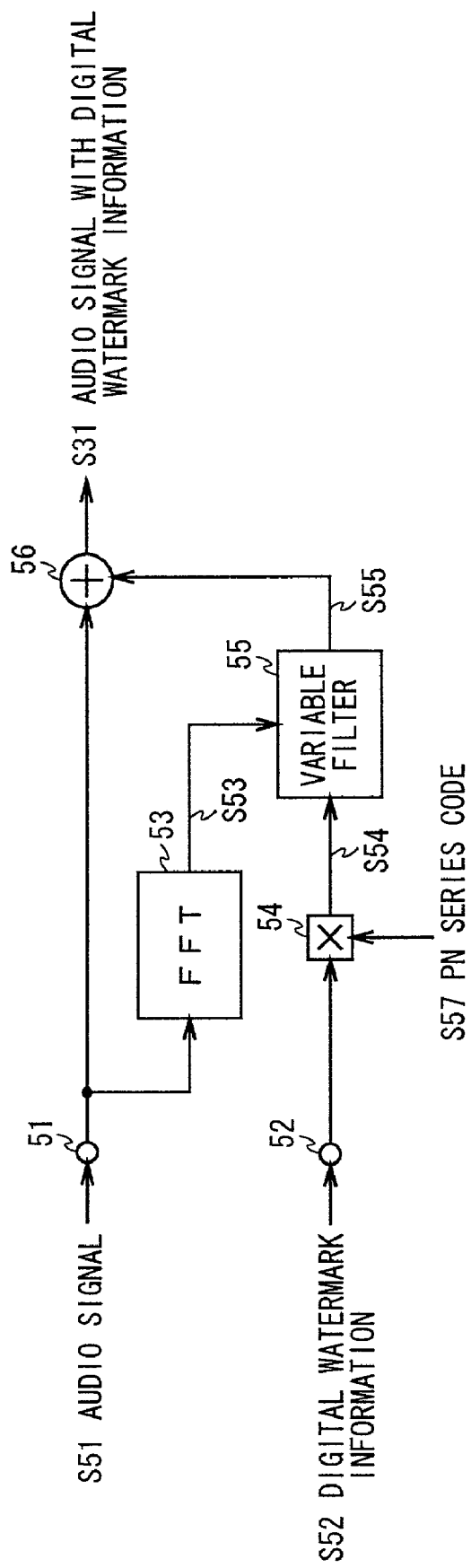
FIG. 2 is a block diagram showing the configuration of a digital watermark information embedding device.

As shown in FIG. 2, the digital watermark information embedding device 31 accepts the audio signal S51 input via a terminal 51 in an FFT (Fast Fourier Transformation) processing circuit 53. The FFT processing circuit 53 transforms the audio signal S51 from the time domain to the frequency domain to produce a frequency spectrum S53, and output the frequency spectrum S53 to a variable filter circuit 55.

The digital watermark information embedding device 31 accepts the digital watermark information S52 input via a terminal 52 in a multiplication circuit 54. The multiplication circuit 54 multiplies the digital watermark information S52 by a PN (Pseudo Random Noise) series signal S57 with minute amplitude to produce a digital watermark information signal S54 with minute level amplitude in which the digital watermark information S52 is spectrum spread to a broader frequency band, and output the digital watermark information signal S54 to the variable filter circuit 55.

Figure 3:
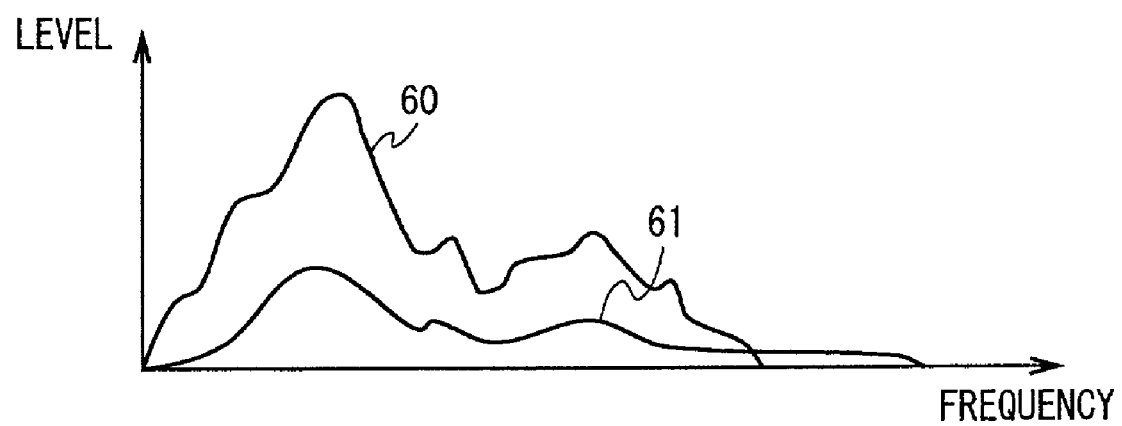
FIG. 3 is a graphic representation of characteristic curves showing the frequency spectrum of an audio signal and a digital watermark information signal.

The variable filter circuit 55 performs a filtering process of the digital watermark information signal S54 with the filter characteristics in accordance with the frequency spectrum S53 to produce a digital watermark information signal S55, and output it to an adder circuit 56. At this time, a frequency spectrum 61 of the digital watermark information signal S55 has a similar shape to a frequency spectrum 60 of the audio signal S51, as shown in FIG. 3.

The adder circuit 56 adds the audio signal S51 from the terminal 51 and the digital watermark information signal S55 from the variable filter circuit 55 to produce an audio signal with digital watermark information S31 in which the digital watermark information is embedded. At this time, the process of embedding the digital watermark information signal S55 into the audio signal S51 is performed in a unit of module consisting of a predetermined number of samples making up the audio signal S51, embedding the digital watermark information signal S55 into the audio signal S51 totally or partly.

The adder circuit 56 outputs the audio signal with digital watermark information S31 to a recording circuit (not shown) to record on the compact disk 33 as shown in FIG. 1.

Figure 4:
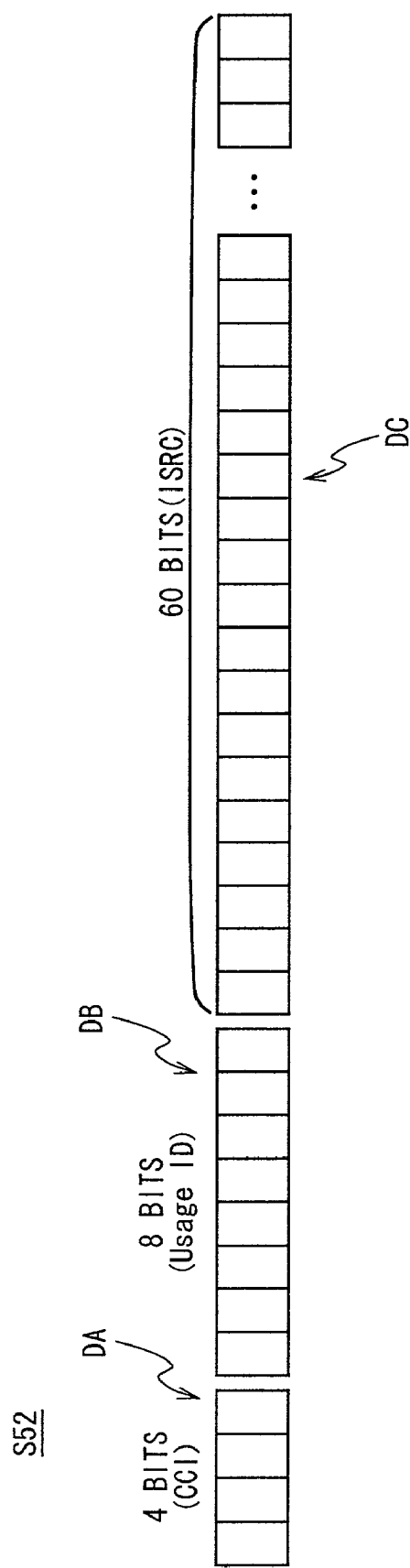
FIG. 4 is a diagram showing the data structure of the digital watermark information.

FIG. 4 shows the data structure of the digital watermark information S52, composed of the CCI (Copy Control Information) DA (4 bits), the usage information ID (Usage ID) DB (8 bits), and the record number information (ISRC (International Standard Recording Code)) DC (60 bits) which are transmitted as the digital watermark information. In this distribution system, the copy control information (CCI) and the usage information ID (Usage ID) DB of the digital watermark information S52 are transmitted at every fifteen seconds, and the record number information (ISRC) DC is transmitted at every thirty seconds.

The copy control information (CCI) represents the copy information (copy permitted, copy unpermitted, only one copy permitted) of the audio signal with digital watermark information S31 in which the digital watermark information S52 is embedded, in terms of two bits.

Herein, the audio signal with digital watermark information S31 is one in which the audio signal S51 has the digital watermark information S52 embedded by spread spectrum in the frequency band in accordance with the pseudo random noise with minute amplitude, as described above. In this audio signal with digital watermark information S31, there is a relatively high percentage that the digital watermark information S52 is embedded into the redundancy part of the audio signal S51 where the significant information on the human's ears is less concentrated as the noise. Accordingly, in the MP3 encoder 5, when the audio signal with digital watermark information S31 is compressed to produce the MP3 file S5, a part or all of the digital watermark information S52 is lost because the redundancy part is removed to reduce the data amount in the compression process, resulting in a lower survival rate of the digital watermark information S52.

Also, the usage information ID (Usage ID) DB contains the detailed settings regarding the copy of the audio signal with digital watermark information S31. As shown in FIG. 5, one bit (copy control bit) of eight bits represents whether or not the audio signal is to be copied when it is found that the audio signal with digital watermark information S31 (MP3 file S5) is compressed. This bit is set to "1" if the audio signal is not permitted to be copied, and "0" if the copy of the audio signal is permitted.

Three bits (threshold setting bit) of eight bits represents a threshold value of the survival rate in judging the compression hysteresis with the survival rate of the digital watermark information. The compression hysteresis is judged to be present if the detection rate (survival rate) of the digital watermark information detected in the computers $7_1$ to $7_n$ on the reception side is less than or equal to this threshold value (survival rate) indicated by this threshold setting bit.

This threshold setting bit is set in accordance with the characteristics of the audio signal S51 in the digital watermark information embedding device 31 (FIG. 1). For the music with a uniform sound pressure level in a broad frequency band, it is required to allocate the quantization bits over the broad frequency band, whereby a smaller number of bits are allocated to a specific frequency band for embedding the digital watermark information, and the survival rate is set to a relatively lower value. On the contrary, for the music having a spectrum with a greater number of bits allocated to a frequency band for embedding the digital watermark information, the survival rate can be set relatively high.

This threshold setting bit is assigned to "111" for a threshold value for the survival rate of the digital watermark information of 80[%], "110" for 70[%], "101" for 60[%], "100" for 50[%], "011" for 40[%], "010" for 30[%], "001" for 20[%], and "000" for 10[%], respectively.

Two bits (quality setting bit) of eight bits represent the allowable quality (of recording or reproduction) in copying the audio signal, when it is found that the audio signal with digital watermark information S31 (MP3 file 5) is compressed. This quality setting bit is assigned to "11" for a bit rate of 64[kbps] in stereo, "10" for 48[kbps] in stereo, "01" for 48[kbps] in monaural, and "00" for 32[kbps] in monaural, respectively.

Two bits (compression method setting bit) of eight bits represent the compression method and its quality allowable in copying the audio signal, when it is found that the audio signal with digital watermark information S31 (MP3 file 5) is compressed. This compression method setting bit is assigned to "11" for a bit rate of 64[kbps] in stereo with the AAC (Advanced Audio Coding) method, "10" for 32[kbps] in monaural with the AAC method, "01" for 64[kbps] in stereo with the MP3 method, and "00" for 32[kbps] in monaural with the MP3 method, respectively.

At the Web site 2 (FIG. 1), the CD player 4 reads out the audio signal with digital watermark information S31 recorded on the recording face of the compact disk 33 by means of an optical pick-up while rotating the compact disk 33, and outputs the read audio signal with digital watermark information S31 to the MP3 encoder 5.

Figure 6:
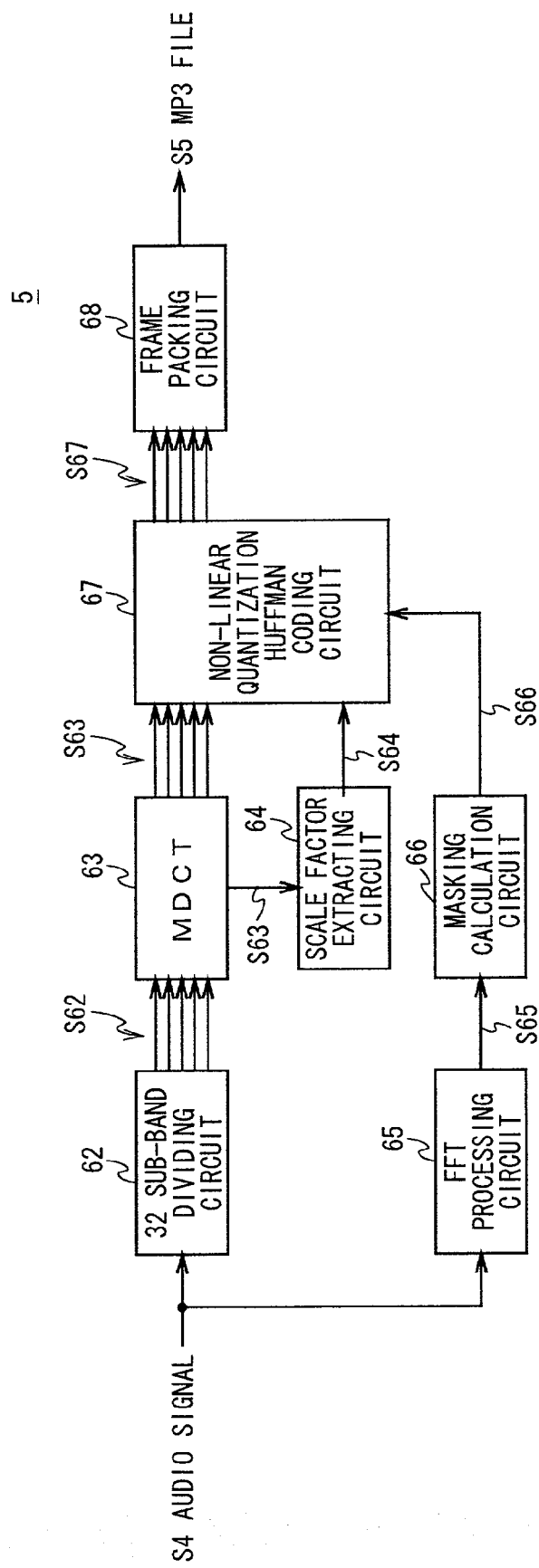
FIG. 6 is a block diagram showing the configuration of an MP3 encoder.

As shown in FIG. 6, the MP3 encoder 5 comprises a 32 sub-band dividing circuit 62, an MDCT processing circuit 63, a scale factor extracting circuit 64, an FFT processing circuit 65, a masking calculation circuit 66, a non-linear quantization Huffman coding circuit 67 and a frame packing circuit 68, to produce an MP3 file S5 having the information amount of the audio signal with digital watermark information S31 compressed to about one-tenth.

The 32 sub-band dividing circuit 62 divides the audio signal with digital watermark information S31 input from the CD player 4 (FIG. 1) into 32 frequency bands, and outputs each audio signal with digital watermark information S62 to the MDCT processing circuit 63.

The MDCT processing circuit 63 performs an MDCT (Modified Discrete Cosine Transformation) process for reducing block distortion to obtain the 256 MDCT coefficients from 512 samples contained in the audio signal with digital watermark information S62, and output the MDCT coefficients S63 to the scale factor extracting circuit 64.

The scale factor extracting circuit 64 normalizes the MDCT coefficients so that the maximum MDCT coefficient of the 256 MDCT coefficients is 1.0, for example, and outputs its magnification as a scale factor S64 to the non-linear quantization Huffman coding circuit 67.

The FFT processing circuit 65 performs an FFT process for the audio signal with digital watermark information S31 in a unit of 1024 samples to produce an FFT transform coefficient, and output the FFT transform coefficient S65 to the masking calculation circuit 66.

The masking calculation circuit 66 calculates a masking curve on the basis of the FFT transform coefficient S65, employing the masking characteristics on the hearing sense, and outputs the calculated result S66 to the non-linear quantization Huffman coding circuit 67.

The non-linear quantization Huffman coding circuit 67 performs the non-linear quantization and the Huffman coding for the MDCT coefficients S63, using the scale factor S64 and the calculated result S66 of the masking curve, to produce the coded data S67, which are then output to the frame packing circuit 68.

In this case, in making the non-linear quantization of the MDCT coefficients S63, the information regarding the level of each frequency component of the audio signal with digital watermark information S31 may be lost due to quantization error.

The frame packing circuit 68 appends a frame header and the bit allocation information to the coded data S67 to produce the MP3 file S5, which is then output to the computer 6 (FIG. 1).

In FIG. 1, the computer 6 (FIG. 1) receives a request signal from a computer $7_1$ to $7_n$ which the user employs via the network 1, and then transmits the MP3 file S5 in response to the request signal via the network 1 to the computer $7_1$ to $7_n$ that is a transmitting source of the request signal.

Figure 7:
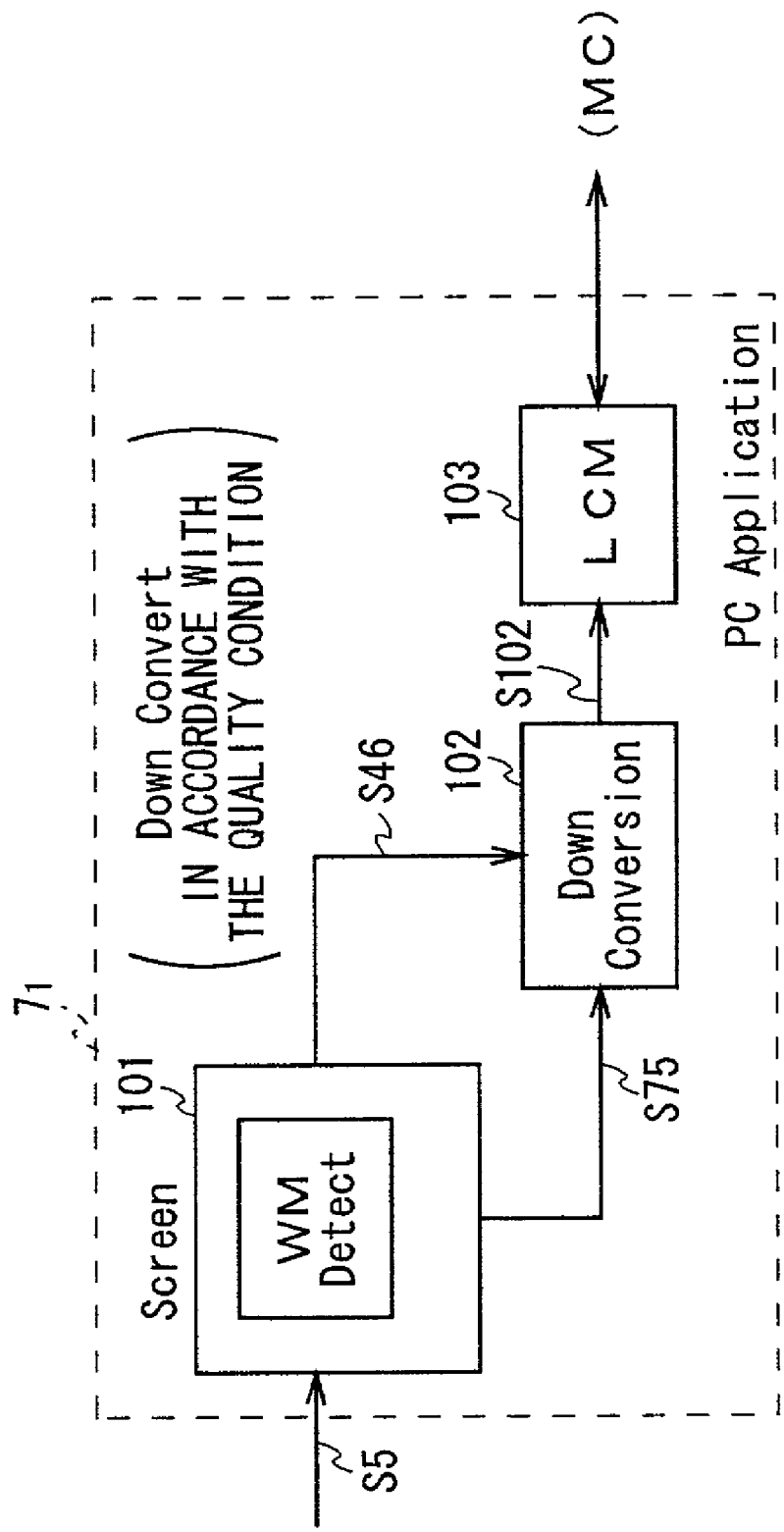
FIG. 7 is a block diagram showing the configuration of a reception-side computer.

Since each of the computers $7_1$ to $7_n$ has the same configuration, the configuration of a computer $7_1$ will be typically described. FIG. 7 shows a functional block with the application programs of the computer $7_1$, in which the MP file S5 distributed via the network 1 (FIG. 1) is input into a screen processor 101 of the computer $7_1$.

The screen processor 101 outputs an audio signal with digital watermark information S75 produced by decoding the MP3 file S5 to a down converter 102, and outputs a digital watermark detection signal S46 in accordance with the survival rate of a digital watermark information signal S55 embedded into the audio signal with digital watermark information S75 to the down converter 102.

Figure 8:
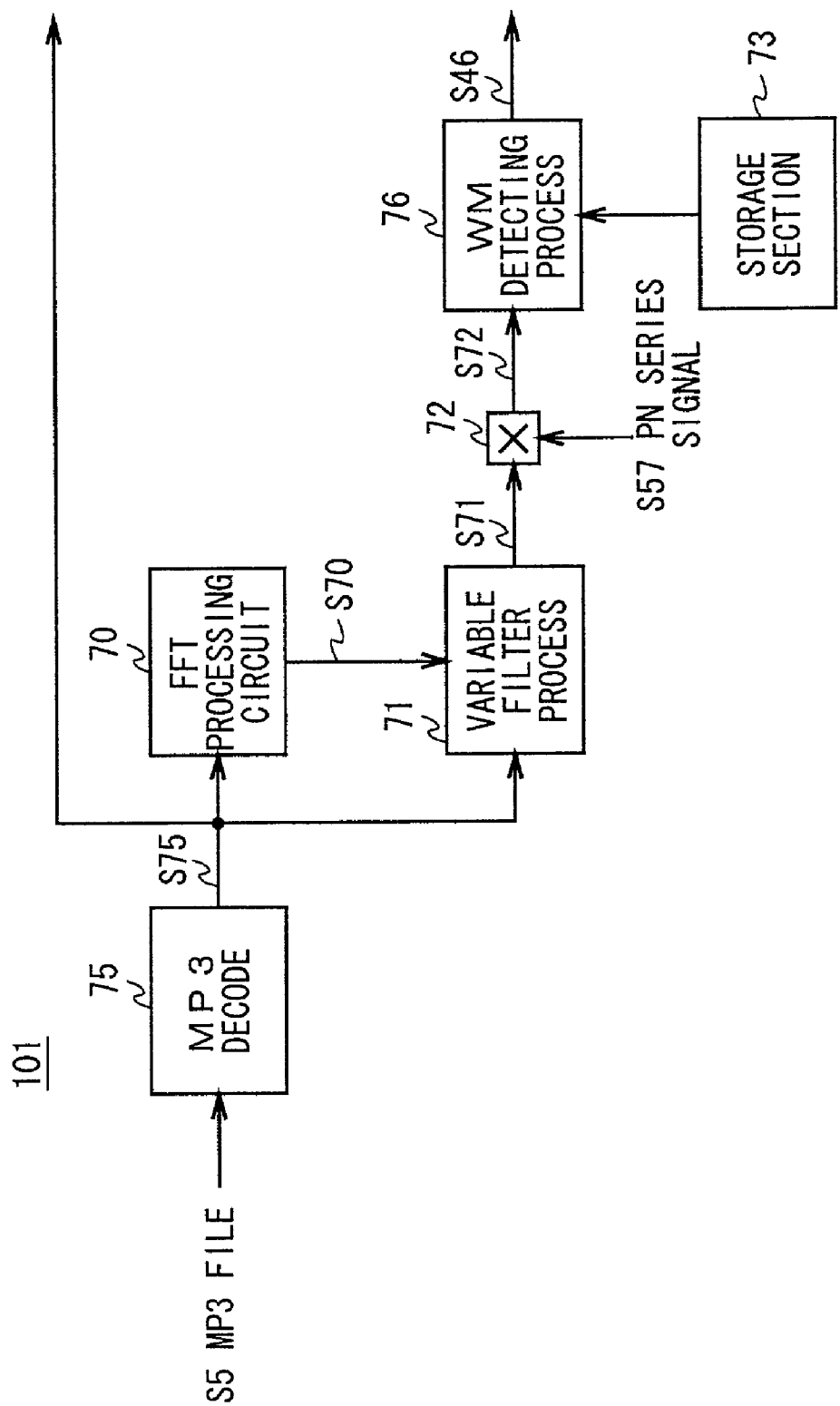
FIG. 8 is a block diagram showing the configuration of a screen processing unit.

FIG. 8 shows a functional block of the screen processor 101, in which an MP3 decoding section 75 produces an audio signal with digital watermark information S75 by expanding the MP3 file S5 that has been compressed and outputs this audio signal S75 to an FFT processing section 70 and a variable filter processing section 71.

The FFT processing section 70 transforms the audio signal with digital watermark information S75 from the time domain to the frequency domain to produce a frequency spectrum S70, and outputs the frequency spectrum S70 to the variable filter processing section 71. The variable frequency filter processing section 71 corrects the audio signal with digital watermark information S75 with the filter characteristics according to the frequency spectrum S70, and outputs the corrected audio signal with digital watermark information S71 to a multiplication processing section 72.

The multiplication processing section 72 multiplies the audio signal with digital watermark information S71 by a PN series code that is identical to the PN series code S57 as shown in FIG. 2, to produce a digital watermark information signal S72 with the PN series code removed. The multiplication processing section 72 outputs the digital watermark information signal S72 to a digital WM (Water Mark) information detecting section 76. A storage section 73 stores a reference value Ref as shown in FIG. 9A that is the information amount of the digital watermark information signal which the digital watermark information embedding device 31 has embedded.

This reference value Ref, which is set in accordance with a detecting method of the digital watermark information (particularly a value of threshold Th), is normally settled in advance (before distribution) between the copyright holder of the audio signal and the owner of a corresponding one of the computers $7_1$ to $7_n$, and stored in the storage section 73 by setting or external input.

The digital watermark information detecting section 76 obtains the survival rate DT (FIG. 9B) of the digital watermark information on the basis of the detection amount obtained by integrating the extracted digital watermark information signal S72 for a certain time and the information amount stored in the storage section 73. And the digital watermark information detecting section 76 detects the threshold setting bit (FIG. 5) in the usage information ID (Usage ID) DB (FIG. 4) as digital watermark information embedded beforehand into the audio signal by the digital watermark information embedding device 31, and makes a comparison between the threshold Th indicated by this threshold setting bit and the survival rate DT of digital watermark information.

As a result of comparison, when the survival rate DT is higher than the threshold Th, as shown in FIG. 9C, this signifies that the digital watermark information exists strongly, or there is less compression hysteresis. On the other hand, when the survival rate DT is lower than the threshold Th, as shown in FIG. 9D, this signifies that the digital watermark information exists weakly, or there is some compression hysteresis.

When the survival rate DT lies between the threshold Th and 100%, it is judged that there is no compression hysteresis. This is due to the fact that the survival rate DT will not reach 100[%] because a detection error may occur even when the audio signal is not compressed.

Accordingly, in the case where it is judged that some compression hysteresis is present, it is esteemed that this audio signal has been distributed by the Web site opening side without the prior permission of the copyright holder. Accordingly, it is necessary to discriminate whether or not the audio signal is to be copied (recorded on the memory card) in accordance with the will of the copyright holder (inhibit, permissible or partly permissible).

Thus, the digital watermark information detecting section 76 discriminates whether or not the audio signal with digital watermark information S75 is to be copied (recorded on the memory card) on the basis of the relation between the survival rate DT and the threshold Th.

Figure 9:
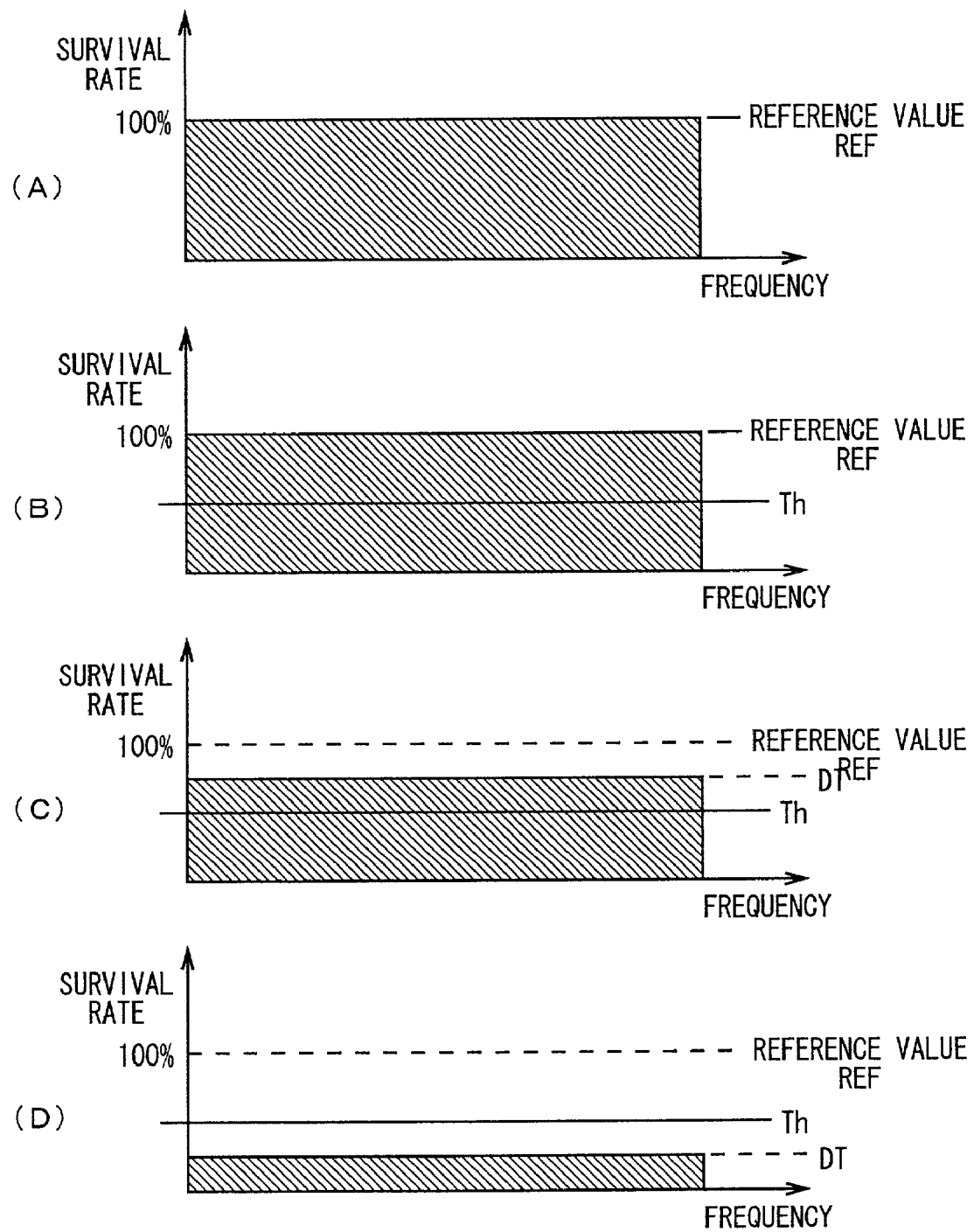
FIG. 9 is a graphical representation of characteristic curves for explaining the survival rate of digital watermark information.
Figure 10:
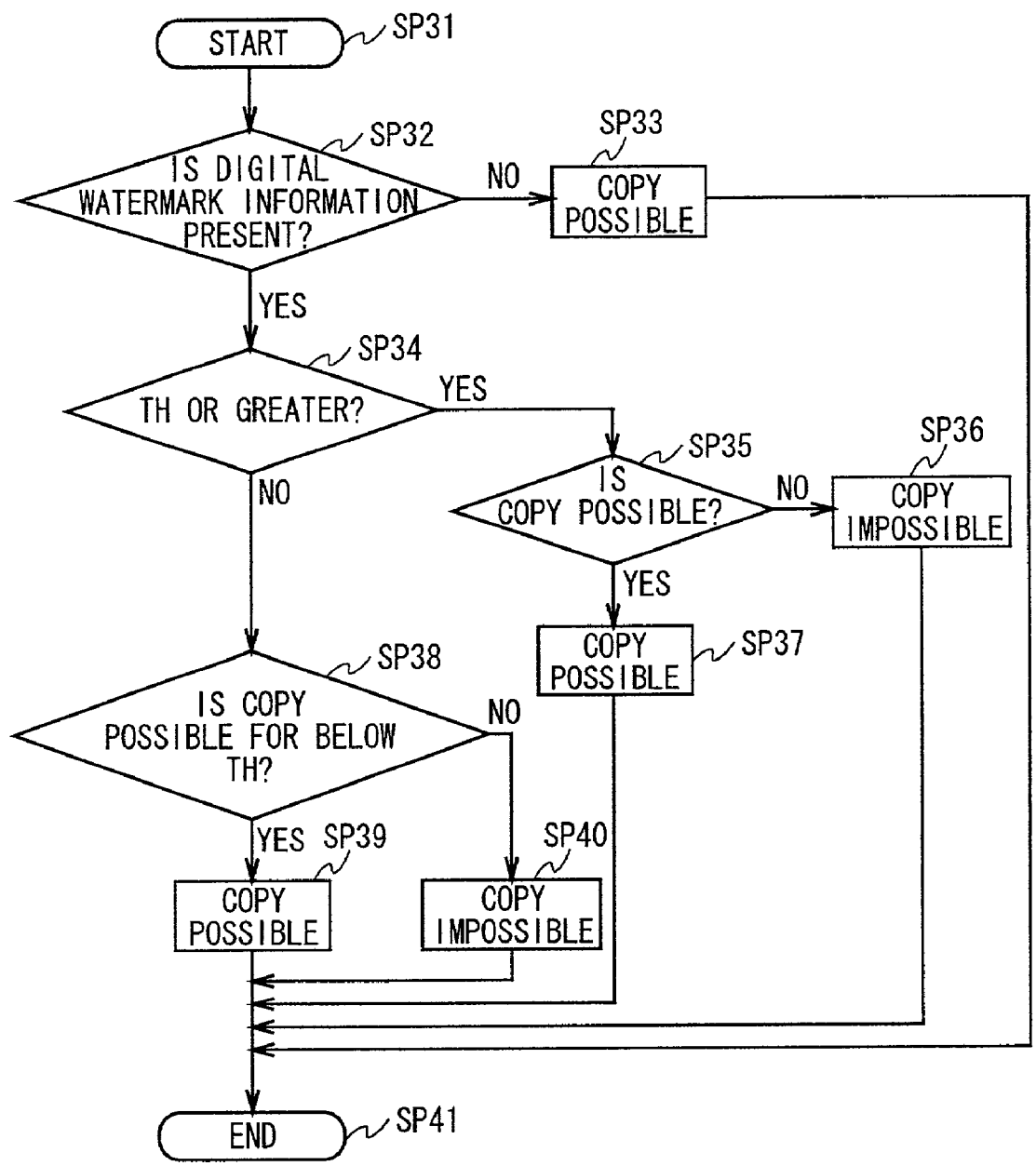
FIG. 10 is a flowchart showing a processing procedure of the screen processing unit.

As shown in FIG. 10, the digital watermark information detecting section 76 enters a copy permission discriminating procedure of the audio signal at step SP31. At step SP32, it is determined whether or not the digital watermark information is present in the audio signal detected at this time. In this connection, whether or not the digital watermark information is present in the audio signal can be determined in such a way as to set the survival rate of digital watermark information as shown in FIG. 9 to a low value (e.g., about 5 to 10%), in consideration of the quantization error in encoding, and obtain an affirmative result at step SP32, if the digital watermark information exceeding the low survival rate is present in the audio signal that is subjected to judgement.

And the digital watermark information detecting section 76 transfers to the next step SP34 to determine whether or not the survival rate DT of digital watermark information is greater than or equal to the threshold Th as described above and shown in FIG. 9. Herein, if an affirmative result is obtained, the audio signal having the digital watermark information embedded has no compression hysteresis, as described above and shown in FIG. 9C. Then, the digital watermark information detecting section 76 transfers to step SP35 to determine whether the copy of the audio signal is permitted (step SP37) or not (step SP36) by detecting the copy control information (CCI) DA as described above and shown in FIG. 4 from the digital watermark information. The result of determination is output as the detection information S46 to the down converter 102.

On the other hand, if a negative result is obtained at step SP34, the survival rate DT of digital watermark information is below the threshold Th (FIG. 9D), in other words, the audio signal having the digital watermark information embedded has some compression hysteresis. Then, the digital watermark information detecting section 76 transfers to step SP38 to determine whether or not the copy of the audio signal is permitted on the basis of the copy control bit of the usage information ID (Usage ID) DB (FIGS. 4 and 5) in the digital watermark information.

Herein, if an affirmative result is obtained at step SP38, the copy control bit indicates that the copy of the audio signal is permitted. Then, the digital watermark information detecting section 76 transfers to step SP39 to obtain a detection result that the copy of the audio signal is permitted. Moreover, the copy qualification information in accordance with the quality setting bit and the compression method setting bit of the usage information ID (Usage ID) DB (FIGS. 4 and 5) is output as the detection information S46 to the down converter 102.

On the other hand, if a negative result is obtained at step SP38, the copy control bit of the usage information ID (Usage ID) DB (FIGS. 4 and 5) indicate that the audio signal is not permitted to be copied. Then, the digital watermark information detecting section 76 transfers to step SP39 to obtain a detection result that the audio signal is permitted to be copied. The detection result is then output as the detection information S46 to the down converter 102.

In this way, the down converter 102 of the computer $7_1$ on the reception side determines whether the audio signal with digital watermark information S75 is permitted to be copied or not in accordance with the detection information S46 supplied from the screen processor 101. If the copy of the audio signal is not permitted, an output process of the audio signal with digital watermark information S75 is stopped.

On the other hand, the down converter 102 of the computer $7_1$ on the reception side down converts the audio signal with digital watermark information S75 into the quality under the conditions (with the quality setting bit and the compression method setting bit of the usage information ID (Usage ID) DB (FIGS. 4 and 5)), in the case where the survival rate DT of digital watermark information is greater than or equal to the threshold Th, or below the threshold Th and the copy of the audio signal is permitted.

And the audio signal with digital watermark information S102 that has been down converted is supplied to an LCM (Licensed Compliant Module) 103 that follows. The LCM 103 performs a compression and encryption process for the audio signal with digital watermark information S102 to record (or copy) the compressed audio signal on the memory card $16_1$ (FIG. 1), only if the audio signal with digital watermark information S102 can be compressed in accordance with the compression method as specified by the compression method setting bit.

Thus, in the computer $7_1$ on the reception side which the user employs, the compression hysteresis of the audio signal is judged in accordance with the survival rate DT of digital watermark information, when the digital watermark information is embedded into the audio signal to be reproduced or copied. That is, when there is no compression hysteresis, the audio signal to be reproduced or copied is recorded on a compact disk which the user bought. On the contrary, when there is any compression hysteresis, the audio signal to be reproduced or copied has been distributed via the network. And when there is any compression hysteresis, the qualified copy is only permitted in accordance with the quality setting bit and the compression method setting bit of the usage information ID (Usage ID) DB of the digital watermark information by the intention of the copyright holder.

In this connection, when the digital watermark information is not detected, it is considered that the compact disk having only the audio signal recorded is purchased and reproduced. The digital watermark information detecting section 76 of the computer $7_1$ can copy the audio signal, judging that the audio signal has been distributed legally via the network, and made public by the copyright holder without charge.

Also, the copy control bit (FIG. 5) of the usage information ID (Usage ID) is settable such that an MD (Mini Disc) recording the audio signal in a compressed state bought by the user can be reproduced or copied, because the copy of the audio signal is permitted even when the survival rate DT of digital watermark information is smaller than the threshold Th.

In the above configuration, if the audio signal with digital watermark information (MP3 file S5) that has been distributed is received by the computer $7_1$, the screen processor 101 determines whether or not there is any digital watermark information. In this case, since the audio signal is compressed in the MP3 file and distributed, the survival rate DT of digital watermark information is reduced due to compression, even if the digital watermark information is present.

Accordingly, the digital watermark information detecting section 76 of the screen processor 101 judges that the compression hysteresis is present for the audio signal with digital watermark information S75 that is subjected to judgement on the basis of the survival rate DT. And the digital watermark information detecting section 76 enables only the audio signal to be copied in accordance with the quality setting bit and the compression method setting bit of the digital watermark information on the basis of the result of judgement.

In this way, the audio signal compressed in accordance with the MP3 method and distributed is enabled to be copied on the recording medium such as a memory card $16_1$ in a lower quality state. Hence, the audio signal can be distributed as a part of promotion based on the will of the copyright holder, thereby bringing about a propaganda impact.

With the above configuration, the compression hysteresis of the audio signal is judged in accordance with the survival rate DT of digital watermark information embedded into the audio signal, and the detailed copy condition is set in the digital watermark information. In this way, the audio signal can be copied under certain conditions, even when there is any compression hysteresis.

In the above embodiment, the compression hysteresis of the audio signal is judged on the basis of the survival rate DT of one digital watermark information. However, the compression hysteresis of the audio signal may be judged on the basis of the digital watermark information embedded into the voice level not exceeding the audible level of the audio signal (hereinafter referred to as digital watermark information weak to compression) and the digital watermark information embedded into the voice level exceeding the audible level of the audio signal (hereinafter referred to as digital watermark information strong to compression).

Figure 11:
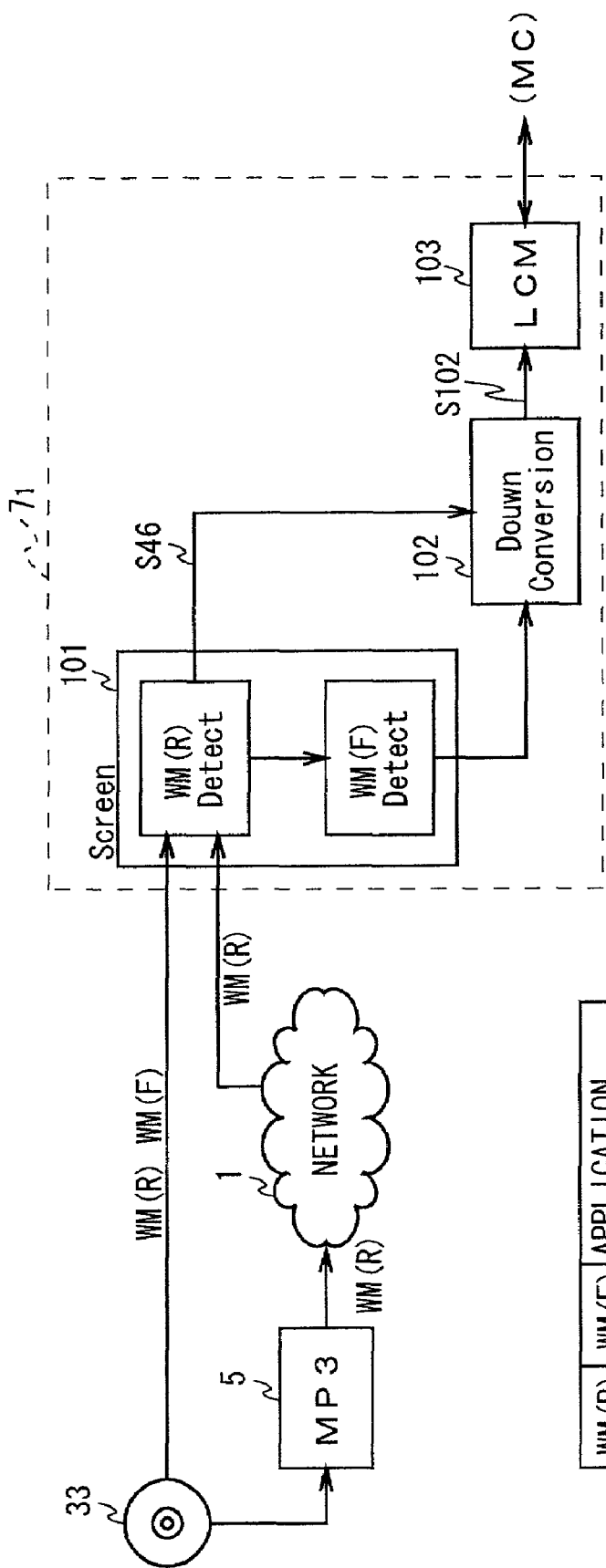
FIG. 11 is a block diagram showing a configuration example for judging the compression hysteresis on the basis of the digital watermark information strong to compression and the digital watermark information weak to compression.

In FIG. 11, wherein the same numerals are attached to the corresponding parts of FIGS. 1 and 7, the digital watermark information strong to compression (WM(R)) and the digital watermark information weak to compression (WM(F)) are embedded into the audio signal recorded on the compact disk 33 by spectrum spreading the audio signal into the frequency band on the basis of the pseudo random noise having minute amplitude by the same method as described above and shown in FIG. 2.

And the digital watermark information strong to compression (WM(R)) is reproduced from the audio signal recorded on the CD 33, compressed via the MP3 encoder 5, and then transmitted via the network 1 to the screen processor 101 of the computer $7_1$ on the reception side. If not passing through the compression system, the digital watermark information strong to compression (WM(R)) and/or the digital watermark information weak to compression (WM(F)) are directly reproduced from the audio signal recorded on the CD 33, and input into the screen processor 101 of the computer $7_1$ on the reception side.

This screen processor 101 outputs the input audio signal with digital watermark information to the down converter 102 by decoding it as required, and outputs a digital watermark detection signal S46 in accordance with the survival rate of the digital watermark information strong to compression (WM(R)) or the digital watermark information weak to compression (WM(F)) embedded into the input audio signal with digital watermark information to the down converter 102.

In this way, the down converter 102 of the computer 7, on the reception side determines whether the audio signal with digital watermark information strong to compression (WM(R)) or digital watermark information weak to compression (WM(F)) embedded is permitted to be copied or not in accordance with the detection information S46 supplied from the screen processor 101.

That is, when the audio signal does not pass through the compression system, since both the digital watermark information strong to compression (WM(R)) and the digital watermark information weak to compression (WM(F)) are left in the audio signal, the screen processor 101 of the computer $7_1$ on the reception side detects both the digital watermark information, thereby determining that the copy of the audio signal is permitted. On the contrary, when the audio signal passes through the compression system, the digital watermark information strong to compression is only left in the audio signal. Therefore, the screen processor 101 of the computer $7_1$ on the reception side detects only the digital watermark information strong to compression, so that the copy of the audio signal is inhibited or restricted.

In this case, the digital watermark information strong to compression has the same data structure as the copy control information DA, the usage information ID (Usage ID) DB and the record number information DC as described above and shown in FIG. 4, the usage information ID (Usage ID) DB being assigned with the copy control bit (identical to the copy control bit of FIG. 5), the quality setting bit (identical to the quality setting bit of FIG. 5) and the compression method setting bit (identical to the compression method setting bit of FIG. 5), as shown in FIG. 12. As the threshold setting bit, the bits for setting the threshold are assigned to determine the compression hysteresis on the basis of the survival rate of the digital watermark information weak to compression. Accordingly, when the survival rate of the digital watermark information weak to compression is higher than the preset value in the threshold setting bit of the digital watermark information strong to compression, the screen processor 101 judges that the digital watermark information weak to compression is left.

Figure 13:
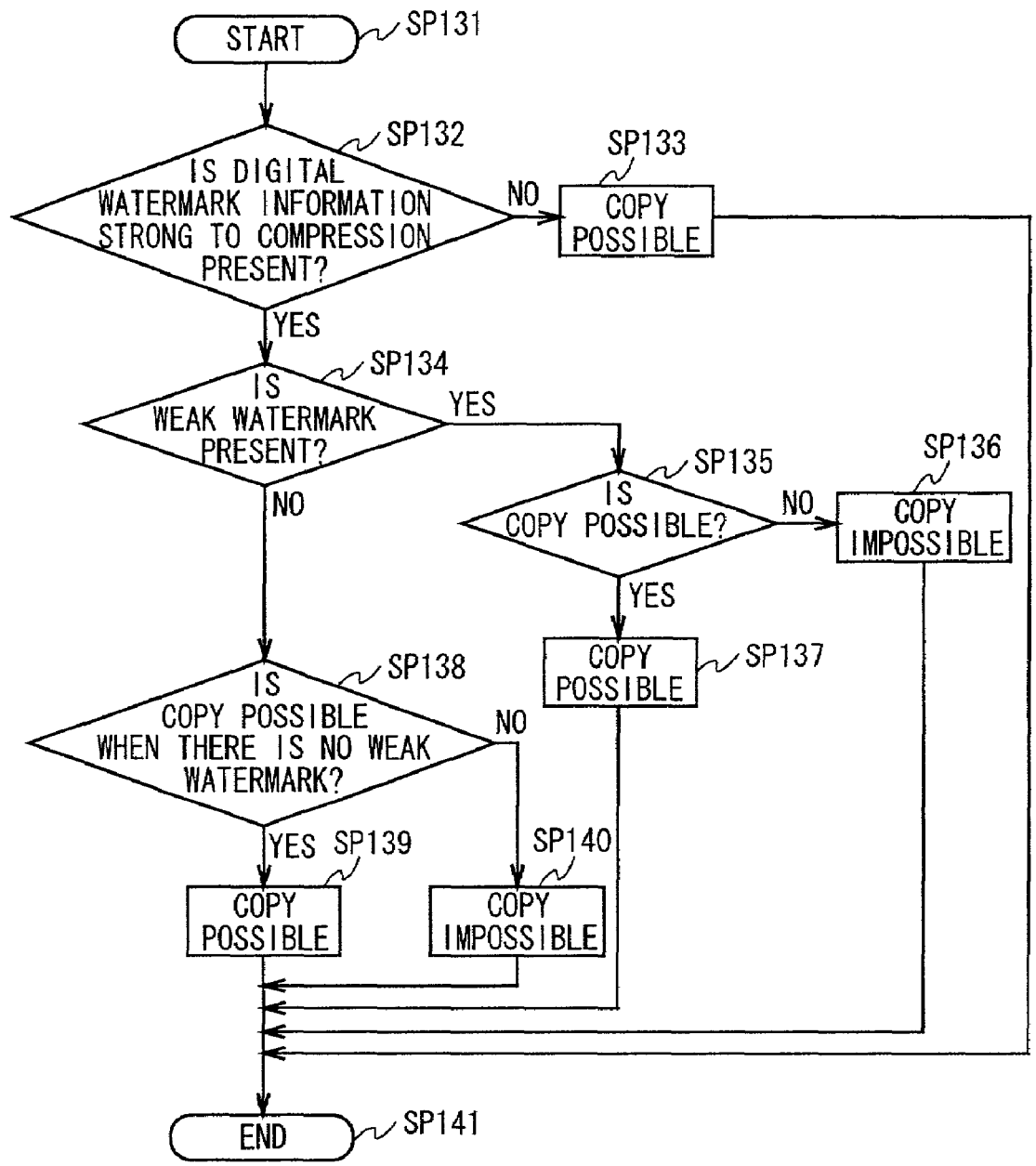
FIG. 13 is a flowchart showing a processing procedure of the screen processing unit.

FIG. 13 shows a processing procedure for determining whether or not the copy of the audio signal is permitted in the digital watermark information detecting section (not shown) of the screen processor 101. The digital watermark information detecting section enters a copy permission discriminating procedure of the audio signal at step SP131. At step SP132, it is determined whether or not the digital watermark information strong to compression is present in the audio signal detected at this time. In this connection, a judgement of whether or not the digital watermark information strong to compression is present in the audio signal can be made in such a way that the survival rate of the digital watermark information is set to a low value (e.g., about 5 to 10%), as shown in FIG. 9, for example, and if there is any digital watermark information exceeding the low survival rate in the audio signal that is subjected to judgement at this time, an affirmative result is obtained at step SP132.

And then the digital watermark information detecting section transfers to the next step SP134 to determine whether or not the survival rate DT of the digital watermark information weak to compression is above the threshold Th as described above and shown in FIG. 12. Herein, if an affirmative result is obtained, the audio signal with digital watermark information embedded has no compression hysteresis. Then, the digital watermark information detecting section transfers to step SP135, to determine whether the copy of the audio signal is permitted (step SP137) or not (step SP136) by detecting the copy control information (CCI) as described above and shown in FIG. 4 from the digital watermark information, the detection result being output as the detection information S46 to the down converter 102.

On the contrary, if a negative result is obtained at step SP134, the survival rate DT of the digital watermark information weak to compression is less than or equal to the threshold Th, in other word, the audio signal with digital watermark information embedded has some compression hysteresis. Then, the digital watermark information detecting section transfers to step SP138, to determine whether or not the copy of the audio signal is permitted on the basis of the copy control bit of the usage information ID (Usage ID) DB (FIG. 12) in the digital watermark information strong to compression.

Herein, if an affirmative result is obtained, the copy control bit indicates that the copy of the audio signal is permitted. Then, the digital watermark information detecting section transfers to step SP139 to obtain a detection result that the audio signal can be copied. Moreover, the copy qualified information according to the quality setting bit and the compression method setting bit of the usage information ID (Usage ID) DB (FIG. 12) is output as the detection information S46 to the down converter 102.

On the other hand, if a negative result is obtained at step SP138, the copy control bit of the usage information ID (Usage ID) DB (FIG. 12) indicates that the audio signal is not permitted to be copied. Then, the digital watermark information detecting section transfers to step SP139 to obtain a detection result that the copy of the audio signal is permitted. The detection result is output as the detection information S46 to the down converter 102.

In this way, the down converter 102 of the computer 7, on the reception side determines whether the audio signal with digital watermark information S75 is permitted to be copied or not in accordance with the detection information S46 supplied from the screen processor 101. If the copy is not permitted, an output process of the audio signal with digital watermark information S75 is stopped. On the contrary, if the copy is permitted, the down converter 102 of the computer $7_1$ on the reception side down converts the audio signal with digital watermark information S75 into the quality conforming to the quality conditions (in accordance with the quality setting bit and the compression method setting bit of the usage information ID (Usage ID) DB (FIG. 12) of the digital watermark information strong to compression).

And the audio signal with digital watermark information S102 that has been down converted is supplied to an LCM (Licensed Compliant Module) 103 that follows. The LCM 103 performs a compression and encryption process for the audio signal with digital watermark information S102 to record (or copy) the compressed audio signal on the memory card $16_1$ (FIG. 1), only when the audio signal with digital watermark information S102 can be compressed in accordance with the compression method as specified by the compression method setting bit.

In this way, the compression hysteresis can be judged employing the digital watermark information strong to compression and the digital watermark information weak to compression.

Figure 14:
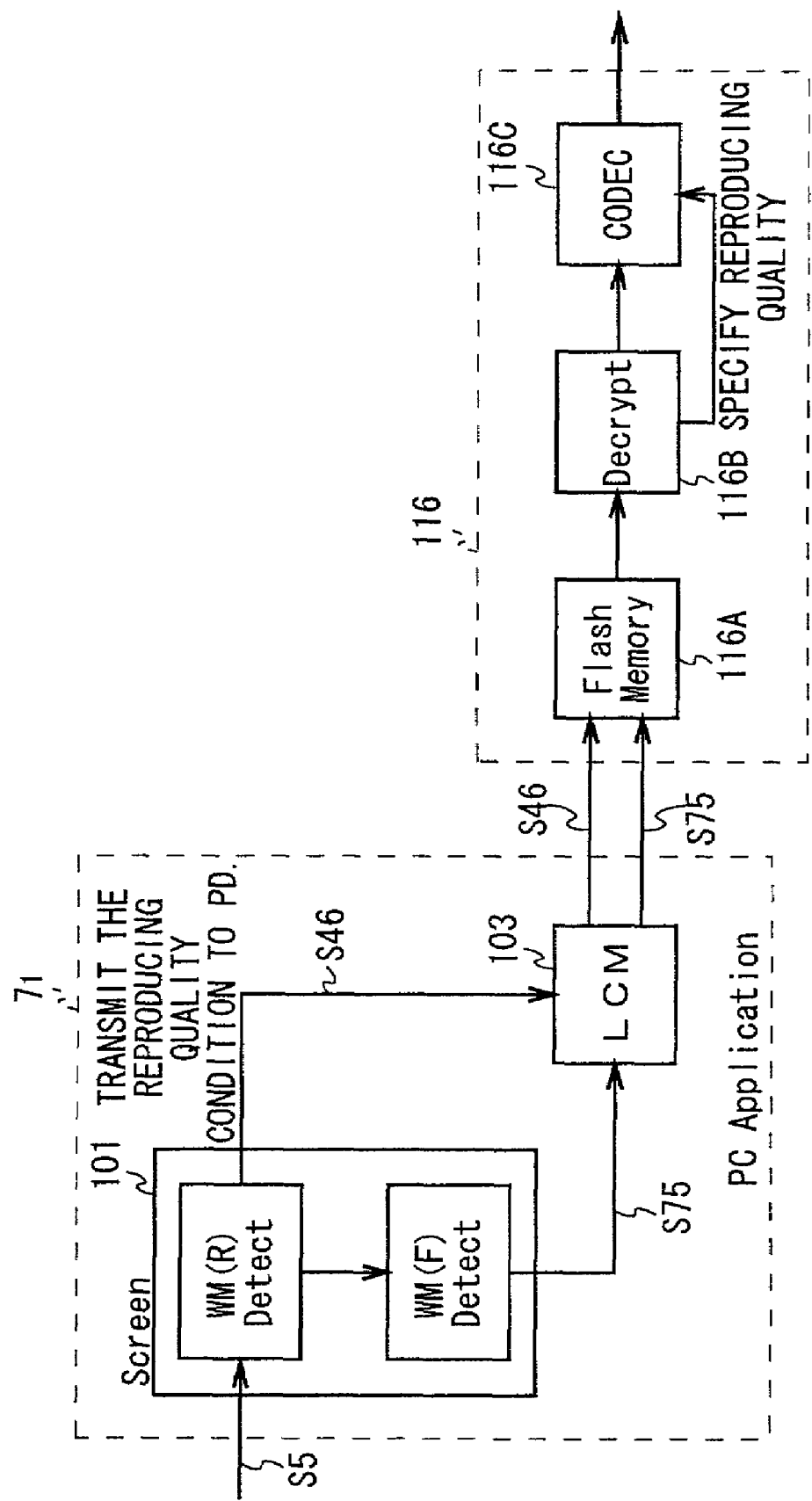
FIG. 14 is a block diagram showing a configuration example of reproduction quality control on the reproduction side.

In the above embodiment, the computer $7_1$ on the reception side degrades the quality based on the compression hysteresis of the audio signal to record the audio signal on the memory card $16_1$. The invention is not limited to the above form, but in FIG. 14, wherein the same numerals are attached to the corresponding parts of FIGS. 7 and 11, the audio signal with digital watermark information S75 as well as the detection information (quality condition) S46 output from the screen processor 101 may be once stored in a flash memory 116A of the memory card 116 without compression, and on the basis of the quality condition decrypted in a cryptanalysis section 116B, the audio signal may be compressed in accordance with the quality condition in the compression processing section 116C that follows and reproduced.

In the above embodiment, the small noise signal obtained by spectrum spreading the digital watermark information is transformed in accordance with the amplitude and frequency characteristics of the audio signal, and added to the audio signal. However, various sorts of digital watermark information embedded into the audio signal can be essentially applied in the invention.

In the above embodiment, the digital watermark information is embedded into the audio signal. However, the digital watermark information may be recorded in a title recording area outside the area for recording the audio signal in the compact disk 33, aside from the audio signal.

In the above embodiment, the memory card is used to copy the contents (e.g., audio signal). However, various kinds of recording medium can be employed.

In the above embodiment, the contents (e.g., audio signal) are copied on the recording medium by the computers $7_1$ to $7_n$. However, in this invention, various apparatuses such as a satellite broadcasting receiver or other contents recording/reproducing device may be utilized.

In the above embodiment, the compression hysteresis of the audio signal is detected to determine whether or not the audio signal is permitted to be copied. However, this invention is not limited to the audio signal, but can be applied to various sorts of information such as a video signal.

In the above embodiment, the screen processor 101, the down converter 102 and the LCM 103 are operated in accordance with the application program of the computer $7_1$ to $7_n$. However, each function may be implemented by the hardware configuration, or by loading a program for performing each function into the computer $7_1$ to $7_n$ from the storage medium (floppy disk, optical disk) storing the program.

Figure 15:
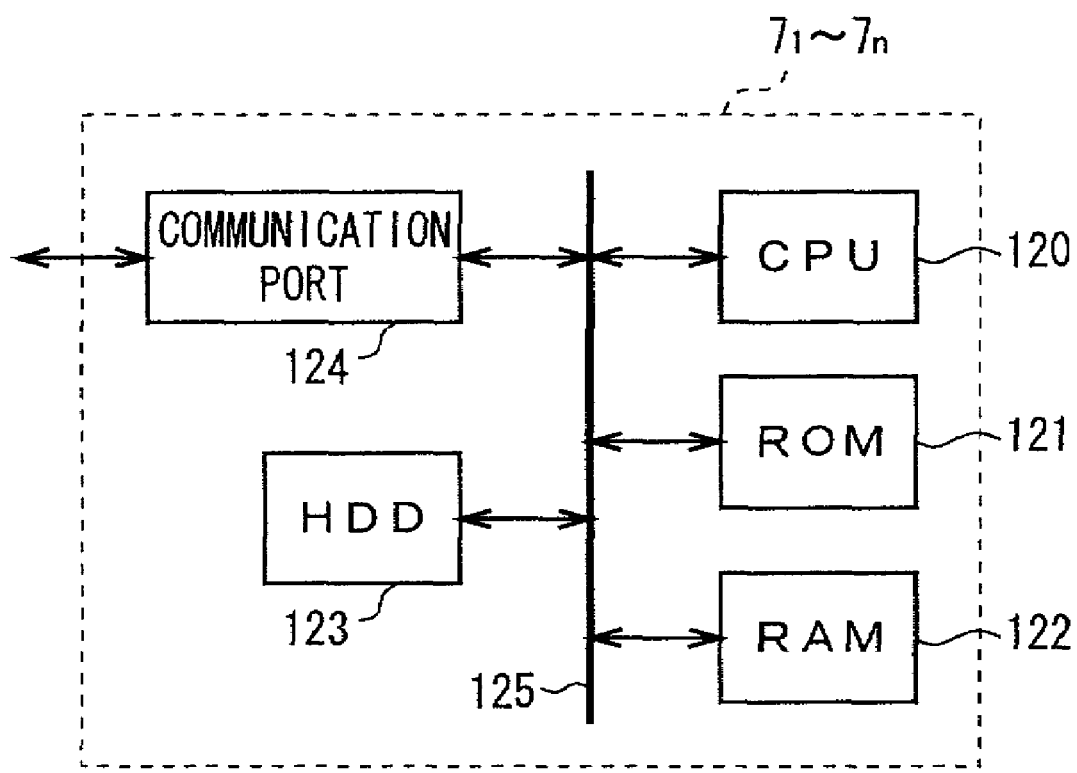
FIG. 15 is a block diagram showing an internal circuit of the computer.

The ordinary computers $7_1$ to $7_n$ as shown in FIG. 15 each have a CPU (Central Processing Unit) 120 for controlling the overall system, a ROM (Read Only Memory) 121 for storing various kinds of software, a RAM (Random Access Memory) 122 serving as a work memory of the CPU 120, a hard disk unit 123 for storing various kinds of data, and a communication port 124 that is an interface for the CPU 120 communicating via the network with the outside, and are interconnected via a bus 125.

In this case, in the computers $7_1$ to $7_n$, a program for implementing each function may be stored in the hard disk unit 123 or the ROM 121, and executed by the CPU 120 to perform each function on the basis of a work memory reserved in the RAM 122. Also, in the computers $7_1$ to $7_n$, the program for implementing each function may be installed via the communication port 124.

Further, in the above embodiment, the digital watermark information S52 is embedded into the audio signal S51 by the digital watermark information embedding device 31 with the hardware configuration as shown in FIG. 2. However, a program for embedding function may be loaded from the program storage medium (e.g., floppy disk, optical disk) storing the program into the computers $7_1$ to $7_n$ to implement the function.

Further, in the above embodiment, the audio signal with digital watermark information is recorded on the compact disk 33, and the survival rate of the digital watermark information when reproduced from the compact disk 33 and compressed is detected. However, the digital watermark information may be embedded into the already compressed audio signal rather than the non-compressed audio signal to prevent the illegal copy in the same manner as described above.

For example, when the digital watermark information is embedded into the already compressed audio signal, and then the audio signal with digital watermark information is distributed or transmitted, the compression is kept at the same strength as when embedded, and a change in the survival rate of digital watermark information may be detected when recompressed.

In the above embodiment, in the case where the audio signal with digital watermark information embedded is compressed, and then distributed or transmitted, the survival rate of digital watermark information is decreased at the time of compression, but if the threshold Th is set to judge the compression hysteresis in expectation of the survival rate of digital watermark information which may fall by the compression before distribution or transmission, the illegal copy can be prevented in the same manner as described above.

Further, in the above embodiment, the original audio signal obtained from the copyright holder is recorded on the compact disk 33, and distributed to the Web site. However, the audio signal may be recorded on various types of recording medium, other than the compact disk 33. Further, the copyright holder may distribute the audio signal via a network to the Web site because the same thing applies in the respect of preventing the secondary distribution.

Further, in the above embodiment, the digital watermark information is employed to determine whether or not to record (or copy) the audio signal. However, the digital watermark information may be used to control the output or reproduction to or from other devices.

INDUSTRIAL APPLICABILITY

The present invention can be applied to an information processing device and method and a program storage medium in the case of protecting the copyright of, for example, music data.

The invention claimed is:

1. An information processing device for controlling an output of contents, characterized by comprising:
    a digital watermark information detection section for detecting a survival rate of digital watermark information distributed with said contents; and
    a control section for controlling the output of said contents on the basis of said survival rate;
    wherein said survival rate is a value determined according to a predetermined reference value and the amount of detected watermark over a predetermined period;
    said control section controls the output of said contents on the basis of copy control information when said survival rate is higher than a predetermined threshold, and controls the output of said contents on the basis of usage information when said survival rate is lower than said predetermined threshold, both said copy control information and said usage information being included in a watermark distributed with said contents.

2. The information processing device according to claim 1, characterized in that the output contents are to be recorded on a recording medium.

3. The information processing device according to claim 1, characterized in that said digital watermark information contains output qualification information, said digital watermark information detection section detects said output qualification information, and said control section controls the output of said contents on the basis of said output qualification information.

4. The information processing device according to claim 3, characterized in that said output qualification information is information for restricting the quality of output of said contents.

5. The information processing device according to claim 3, characterized in that said output qualification information is information for defining a data compression method to be applied to said output contents.

6. The information processing device according to claim 3, characterized in that said control section restricts the output of said contents on the basis of said output qualification information when said survival rate is less than or equal to said predetermined threshold.

7. The information processing device according to claim 6, characterized in that said threshold is included in said digital watermark information.

8. The information processing device according to claim 1, characterized in that said control section inhibits the output of said contents when said survival rate is less than or equal to said predetermined threshold.

9. The information processing device according to claim 8, characterized in that said threshold is included in said digital watermark information.

10. The information processing device according to claim 1, characterized in that said digital watermark information comprises a digital watermark information strong to compression and a digital watermark information weak to compression, and said control section controls the output of said contents on the basis of the presence or absence of said digital watermark information strong to compression and the survival rate of said digital watermark information weak to compression.

11. The information processing device according to claim 10, characterized in that said digital watermark information strong to compression contains the output qualification information, said digital watermark information detection section detects said output qualification information, and said control section controls the output of said contents on the basis of said output qualification information.

12. The information processing device according to claim 11, characterized in that said output qualification information is information for restricting the quality of output of said contents.

13. The information processing device according to claim 11, characterized in that said output qualification information is information for defining a data compression method to be applied to said output contents.

14. The information processing device according to claim 11, characterized in that said control section restricts the output of said contents on the basis of said output qualification information when said survival rate is less than or equal to said predetermined threshold.

15. The information processing device according to claim 14, characterized in that said threshold is included in said digital watermark information strong to compression.

16. The information processing device according to claim 10, characterized in that said control section inhibits the output of said contents when the survival rate of said digital watermark information weak to compression is less than or equal to said predetermined threshold.

17. The information processing device according to claim 16, characterized in that said threshold is included in said digital watermark information strong to compression.

18. An information processing method for controlling an output of contents, comprising the steps of:
    detecting a survival rate of digital watermark information associated with said contents; and
    controlling the output of said contents on the basis of said survival rate;
    wherein said survival rate is a value determined according to a predetermined referenced value and the amount of detected watermark over a predetermined period;
    said step of controlling comprises controlling the output of said contents on the basis of copy control information when said survival rate is higher than a predetermined threshold, and controlling the output of said contents on the basis of usage information when said survival rate is lower than said predetermined threshold, both said copy control information and said usage information being included in a watermark distributed with said contents.

19. The information processing method according to claim 18, characterized in that the output contents are to be recorded on a recording medium.

20. The information processing method according to claim 18, characterized in that said digital watermark information contains output qualification information, said step of detecting said survival rate further comprises detecting said output qualification information, and said step of controlling the output of said contents further comprises controlling the output of said contents on the basis of said output qualification information.

21. The information processing method according to claim 20, characterized in that said output qualification information is for restricting the quality of output of said contents.

22. The information processing method according to claim 20, characterized in that said output qualification information is for defining a data compression method to be applied to said output contents.

23. The information processing method according to claim 18, characterized in that said step of controlling the output of said contents further comprises inhibiting the output of said contents when said survival rate is less than or equal to said predetermined threshold.

24. The information processing method according to claim 23, characterized in that said threshold is included in said digital watermark information.

25. The information processing method according to claim 18, characterized in that said step of controlling the output of said contents further comprises restricting the output of said contents on the basis of said output qualification information when said survival rate is less than or equal to said predetermined threshold.

26. The information processing method according to claim 25, characterized in that said threshold is included in said digital watermark information.

27. The information processing method according to claim 18, characterized in that said digital watermark information comprises a digital watermark information strong to compression and a digital watermark information weak to compression, and said step of controlling the output of said contents further comprises controlling the output of said contents on the basis of the presence or absence of said digital watermark information strong to compression and the survival rate of said digital watermark information weak to compression.

28. The information processing method according to claim 27, characterized in that said digital watermark information strong to compression contains the output qualification information, said step of detecting the presence or absence of said digital watermark information strong to compression and the survival rate of said digital watermark information weak to compression further comprises detecting said output qualification information, and said step of controlling the output of said contents further comprises controlling the output of said contents on the basis of said output qualification information.

29. The information processing method according to claim 28, characterized in that said output qualification information is for restricting the quality of output of said contents.

30. The information processing method according to claim 28, characterized in that said output qualification information is for defining a data compression method to be applied to said output contents.

31. The information processing method according to claim 28, characterized in that said step of controlling the output of said contents further comprises restricting the output of said contents on the basis of said output qualification information when said survival rate is less than or equal to said predetermined threshold.

32. The information processing method according to claim 31, characterized in that said threshold is included in said digital watermark information strong to compression.

33. The information processing method according to claim 27, characterized in that said step of controlling the output of said contents further comprises inhibiting the output of said contents when the survival rate of said digital watermark information weak to compression is less than or equal to said predetermined threshold.

34. The information processing method according to claim 33, characterized in that said threshold is included in said digital watermark information strong to compression.

35. A storage medium having stored thereon a program executable by an information processing device for performing an information processing method, said method comprising the steps of:
   detecting a survival rate of digital watermark information associated with contents; and
   controlling the output of said contents on the basis of said survival rate;
   wherein said survival rate is a value determined according to a predetermined reference value and the amount of detected watermark over a predetermined period;
   said step of controlling comprises controlling the output of said contents on the basis of copy control information when said survival rate is higher than a predetermined threshold, and controlling the output of said contents on the basis of usage information when said survival rate is lower than said predetermined threshold, both said copy control information and said usage information being included in a watermark distributed with said contents.

36. The storage medium according to claim 35, characterized in that the output contents are to be recorded on a recording medium.

37. The storage medium according to claim 35, characterized in that said digital watermark information contains output qualification information, said step of detecting said survival rate further comprises detecting said output qualification information, and said step of controlling the output of said contents further comprises controlling the output of said contents on the basis of said output qualification information.

* * * * *

UNITED STATES PATENT AND TRADEMARK OFFICE
CERTIFICATE OF CORRECTION

PATENT NO.        : 7,366,907 B1
APPLICATION NO. : 09/869258
DATED             : April 29, 2008
INVENTOR(S)       : Tadashi Ezaki Page 1 of 1

It is certified that error appears in the above-identified patent and that said Letters Patent is hereby corrected as shown below:

Column 1, line 17, "of computer" should read --of a computer--;

Column 1, line 19, "medium" should read --media--;

Column 9, line 35, "computer 7, on" should read --computer $7_1$ on--;

Column 10, line 64, "computer 7, on" should read --computer $7_1$ on--.

Signed and Sealed this

Twenty-eighth Day of July, 2009

JOHN DOLL
*Acting Director of the United States Patent and Trademark Office*